US012595875B2

(12) United States Patent
Zhang et al.

(10) Patent No.: US 12,595,875 B2
(45) Date of Patent: Apr. 7, 2026

(54) PROJECTION DEVICE

(71) Applicant: Coretronic Projection (Kunshan) Corporation, Suzhou City (CN)

(72) Inventors: Ying Zhang, Suzhou City (CN); Chih-Hao Wu, Suzhou City (CN); Gang Li, Suzhou City (CN)

(73) Assignee: Coretronic Projection (Kunshan) Corporation, Suzhou City (CN)

( * ) Notice: Subject to any disclaimer, the term of this patent is extended or adjusted under 35 U.S.C. 154(b) by 391 days.

(21) Appl. No.: 18/379,669

(22) Filed: Oct. 13, 2023

(65) Prior Publication Data

US 2024/0125423 A1    Apr. 18, 2024

(30) Foreign Application Priority Data

Oct. 14, 2022    (CN) .......................... 202211256984.0

(51) Int. Cl.
*F16M 11/10*          (2006.01)
*F16M 11/04*          (2006.01)
*G03B 21/54*          (2006.01)

(52) U.S. Cl.
CPC ........... *F16M 11/10* (2013.01); *F16M 11/048* (2013.01); *G03B 21/54* (2013.01)

(58) Field of Classification Search
CPC ........ G03B 21/14; G03B 21/54; G03B 21/58;
G03B 21/145; H04N 9/00; H04N 9/3141;
F16M 11/02; F16M 11/048; F16M 11/10;
F16M 11/28; F16M 11/2014; F16M
11/2064
See application file for complete search history.

(56) References Cited

U.S. PATENT DOCUMENTS

| | | | | |
|---|---|---|---|---|
| 7,182,301 B1* | 2/2007 | Oddsen, Jr. | ............ | F16M 11/24 |
| | | | | 248/74.5 |
| 2011/0221951 A1* | 9/2011 | Iida | ........................... | G02B 7/04 |
| | | | | 348/E5.045 |
| 2021/0356074 A1* | 11/2021 | Na | ........................... | F16B 1/00 |

FOREIGN PATENT DOCUMENTS

| | | |
|---|---|---|
| CN | 304665396 S | 6/2018 |
| TW | 201352120 A | 12/2013 |

* cited by examiner

*Primary Examiner* — Sultan Chowdhury

(57) ABSTRACT

A projection device includes a housing and a bracket assembly. The housing has a first side wall and a second side wall connected to each other, the first side wall has a connecting portion and a limit groove, the limit groove has a curved section and a linear section connected to each other. The second side wall has a projection hole. The bracket assembly includes an adapter and a bracket. The adapter is movably connected to the connecting portion. The bracket is pivotally connected to the adapter and has a limit post extending into the limit groove. When the limit post moves to the linear section, the adapter is adapted to move in the connecting portion and drives the limit post to move in the linear section, so the bracket can be closer to the projection hole and the effect of covering the projection hole by the bracket is improved.

10 Claims, 8 Drawing Sheets

1

PROJECTION DEVICE

CROSS-REFERENCE TO RELATED APPLICATION

This application claims the priority benefit of China Application No. 202211256984.0, filed on Oct. 14, 2022. The entirety of the above-mentioned patent application is hereby incorporated by reference herein and made a part of this specification.

FIELD OF THE INVENTION

The present invention relates to a display device, and more particularly to a projection device.

BACKGROUND OF THE INVENTION

It is commonly known that a lens cover of a projector is mostly connected to a housing of the projector by a string, but a placement position of the lens cover when taken down will be restricted by a length of the string, resulting in inconvenient use and poor appearance, and if the string is removed, there is a risk of losing the lens cover. Therefore, there is already a bracket with a lens cover function on the market.

It is well known that if the bracket with the lens cover function is prevented from interfering with the housing during rotation, there will be a larger gap between the bracket and a lens of the projector when the bracket rotates to a position where the lens is covered, thereby reducing the effect of lens protection. In addition, if the gap between the bracket and the lens is narrowed, a lens side of the housing needs to be designed to be arc-shaped, which will limit shape design of the housing.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a projection device, which enables a bracket of the projection device to be closer to a projection hole, thereby improving the effect of covering the projection hole by the bracket and avoiding the interference between the bracket and a housing.

Other advantages and objects of the invention may be further illustrated by the technical features broadly embodied and described as follows.

To achieve one, part or all of the above objectives or other objectives, the projection device provided by an embodiment of the present invention includes a housing and a bracket assembly. The housing has a first side wall and a second side wall connected to each other, the first side wall has a connecting portion and a limit groove, the limit groove has a curved section and a linear section, the curved section extends around the connecting portion, the linear section is connected to the curved section, the second side wall has a projection hole, and an extension direction of the linear section is substantially parallel to a central axis of the projection hole. In addition, the bracket assembly includes an adapter and a bracket. The adapter is movably connected to the connecting portion. The bracket is pivotally connected to the adapter and has a limit post that extends into the limit groove. When the bracket rotates relative to the adapter, the limit post moves in the curved section, and when the limit post moves to the linear section, the adapter is adapted to move in the connecting portion and drives the limit post to move in the linear section.

In an embodiment of the present invention, the above bracket has a connecting section and a base connected to each other, the connecting section is pivotally connected to the adapter, when the limit post moves to the linear section, the base covers the projection hole, and when the limit post moves in the linear section in a direction away from the curved section, the base moves in a direction close to the projection hole.

In an embodiment of the present invention, the above housing further has a third side wall opposite the second side wall, and when the limit post moves to one end, away from the linear section, of the curved section, the base is adjacent to the third side wall.

In an embodiment of the present invention, a first gear structure is provided on one side, facing the adapter, of the above bracket, the adapter has a second gear structure that matches with the first gear structure, and the first gear structure is meshed with the second gear structure, so that the bracket is pivotally connected to the adapter.

In an embodiment of the present invention, the above adapter has an opening, the second gear structure is arranged on a hole wall of the opening, and the first gear structure extends into the opening.

In an embodiment of the present invention, a limit structure is provided on one side, facing the housing, of the above adapter, the limit structure has two planes parallel to each other, the connecting portion of the housing has a connecting hole, the connecting hole has two limit walls parallel to each other, the adapter is bonded to the connecting hole, and the two planes are opposite to the two limit walls, respectively, so that the adapter is adapted to move along a predetermined direction.

In an embodiment of the present invention, a length of the above two limit walls in the predetermined direction is greater than a length of the two planes in the predetermined direction.

In an embodiment of the present invention, a limit bulge is provided in the above limit groove, and the limit bulge is located at a junction of the linear section and the curved section.

In an embodiment of the present invention, a limit bulge is arranged at a tail end, away from the curved section, of the above linear section, and the limit bulge is adapted to clamp and fix the limit post between the tail end and the limit bulge.

In an embodiment of the present invention, the above projection device further includes a first fastener and a second fastener. The first fastener has a shaft portion, and the shaft portion penetrates through the bracket, the adapter, and the first side wall, and is combined with the second fastener, so that the bracket assembly is fastened to the first side wall.

Since the projection device according to the embodiment of the present invention includes the adapter, the bracket having the limit post, the connecting portion, and the limit groove, the adapter may move in the connecting portion when the limit post moves to the linear section of the limit groove. Therefore, when rotating to the second side wall having the projection hole, the bracket may move in a direction of the projection hole to narrow a gap between the bracket and the projection hole, thereby improving the effect of covering the projection hole by the bracket, and avoiding the interference with the housing when the bracket rotates.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
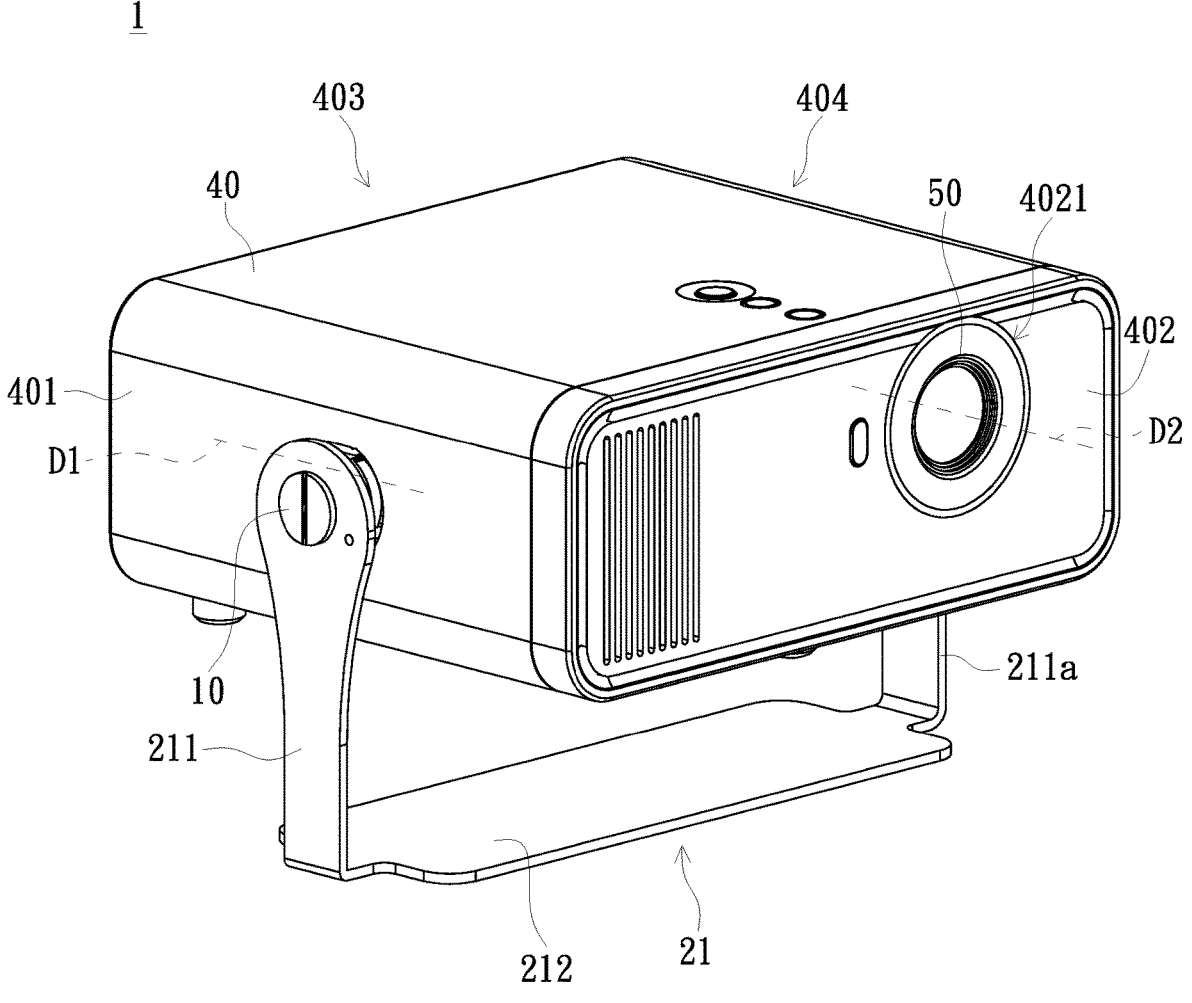
FIG. 1 is a schematic three-dimensional view of a projection device according to an embodiment of the present invention.
Figure 2:
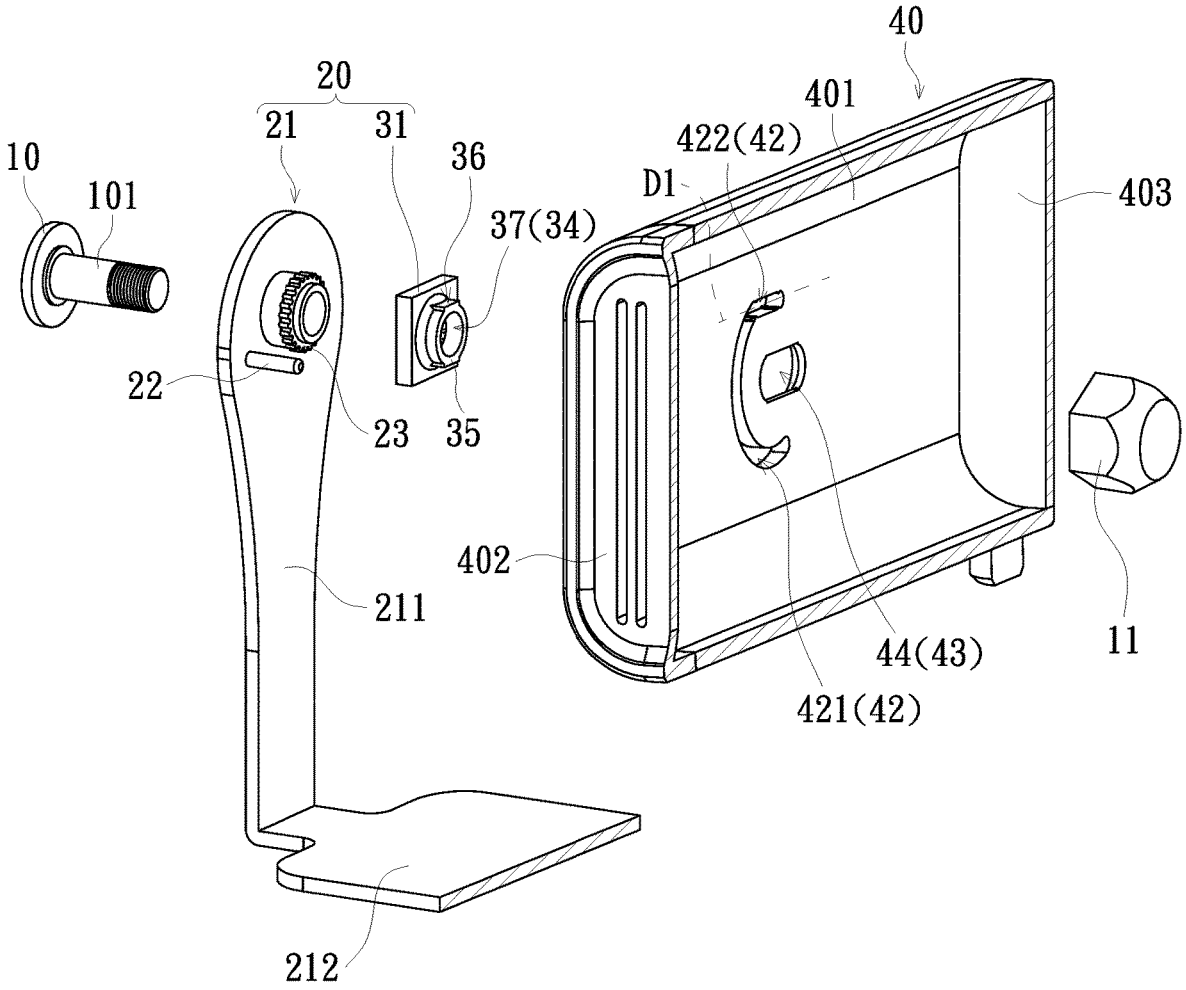
FIG. 2 is a schematic partial exploded view of part of components in FIG. 1.

FIG. 1 is a schematic three-dimensional view of a projection device according to an embodiment of the present invention. FIG. 2 is a schematic partial exploded view of part of components in FIG. 1. Referring to FIG. 1 and FIG. 2, the projection device 1 provided by this embodiment includes a housing 40 and a bracket assembly 20. The housing 40 has a first side wall 401 and a second side wall 402 connected to each other. The first side wall 401 has a connecting portion 43 and a limit groove 42, the limit groove 42 has a curved section 421 and a linear section 422, and the curved section 421 extends around the connecting portion 43. In this embodiment, the curved section 421 is arranged at least partially around the connecting portion 43. The linear section 422 is connected to the curved section 421, specifically, one end of the curved section 421 is connected to one end of the linear section 422. The second side wall 402 has a projection hole 4021, and an extension direction D1 of the linear section 422 is substantially parallel to a central axis D2 of the projection hole 4021. In addition, the bracket assembly 20 includes an adapter 31 and a bracket 21. The adapter 31 is movably connected to the connecting portion 43. The bracket 21 is pivotally connected to the adapter 31 and has a limit post 22 that extends into the limit groove 42. The projection device 1 further includes a projection lens 50, where the projection lens 50 is arranged in the housing 40 and corresponding to the projection hole 4021, but is not limited thereto. In another embodiment, at least an element in the projection lens 50 is arranged in the projection hole 4021 of the second side wall 402.

The above projection device 1 further includes, for example, a first fastener 10 and a second fastener 11, where the first fastener 10 has a shaft portion 101, and the shaft portion 101 penetrates through the bracket 21, the adapter 31, and the first side wall 401, and is combined with the second fastener 11, so that the bracket assembly 20 is fastened to the first side wall 401. In addition, the projection hole 4021 of the second side wall 402 exposes the projection lens 50.

The above bracket 21 has, for example, a connecting section 211 and a base 212 connected to each other, and the connecting section 211 is pivotally connected to the adapter 31. The above limit post 22 is arranged in the connecting section 211. The bracket 21 in this embodiment may further have another connecting section 211a that is the same as the connecting section 211, but the present invention does not limit that the bracket 21 is required to have the connecting section 211a. In this embodiment, the base 212 is connected between the two connecting sections 211 and 211a. The housing 40 further has a fourth side wall 404 opposite the first side wall 401, and the fourth side wall 404 also has another connecting portion (not shown in the figure) and another limit groove (not shown in the figure) that are the same as the connecting portion 43 and the limit groove 42 of the first side wall 401. The connecting portion of the fourth side wall 404 is also provided with another adapter (not shown in the figure) that is the same as the above adapter 31, to be pivotally connected to the connecting section 211*a*. Due to a same operating mechanism of the connecting sections 211 and 211*a*, the following will take the connecting section 211 as an example for detailed description.

Figure 3B:
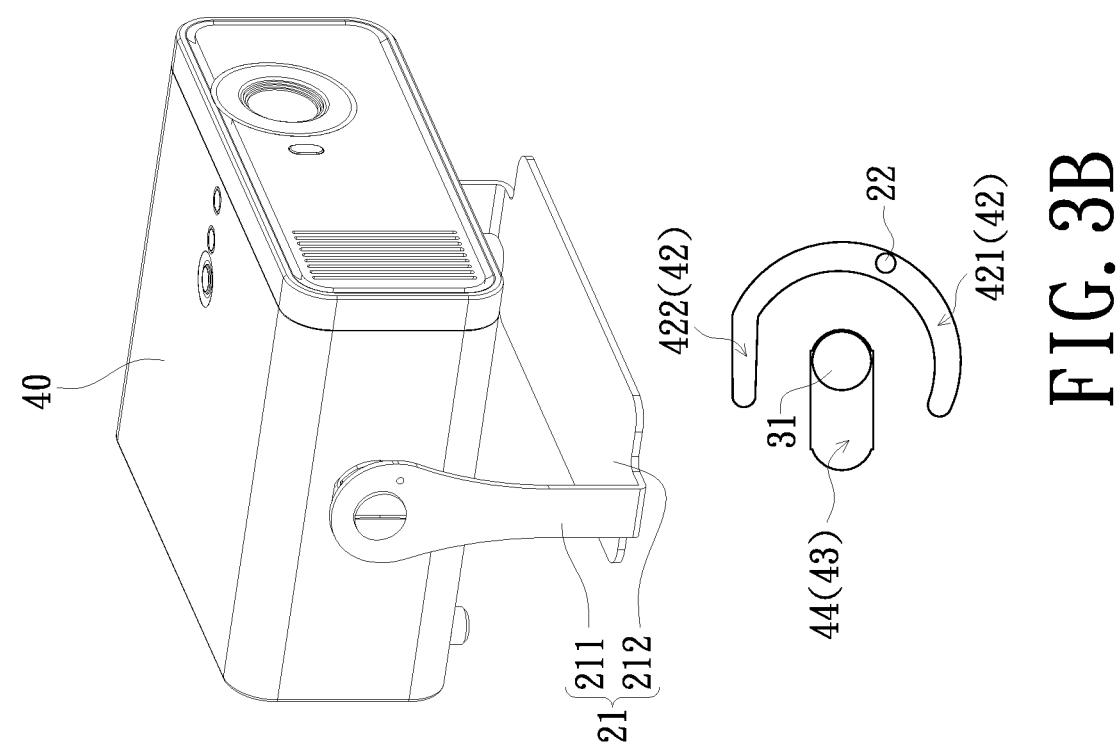
FIG. 3A to FIG. 3D are schematic diagrams of rotation of a bracket relative to a housing when a limit post moves at a curved section according to an embodiment of the present invention.
Figure 3A:
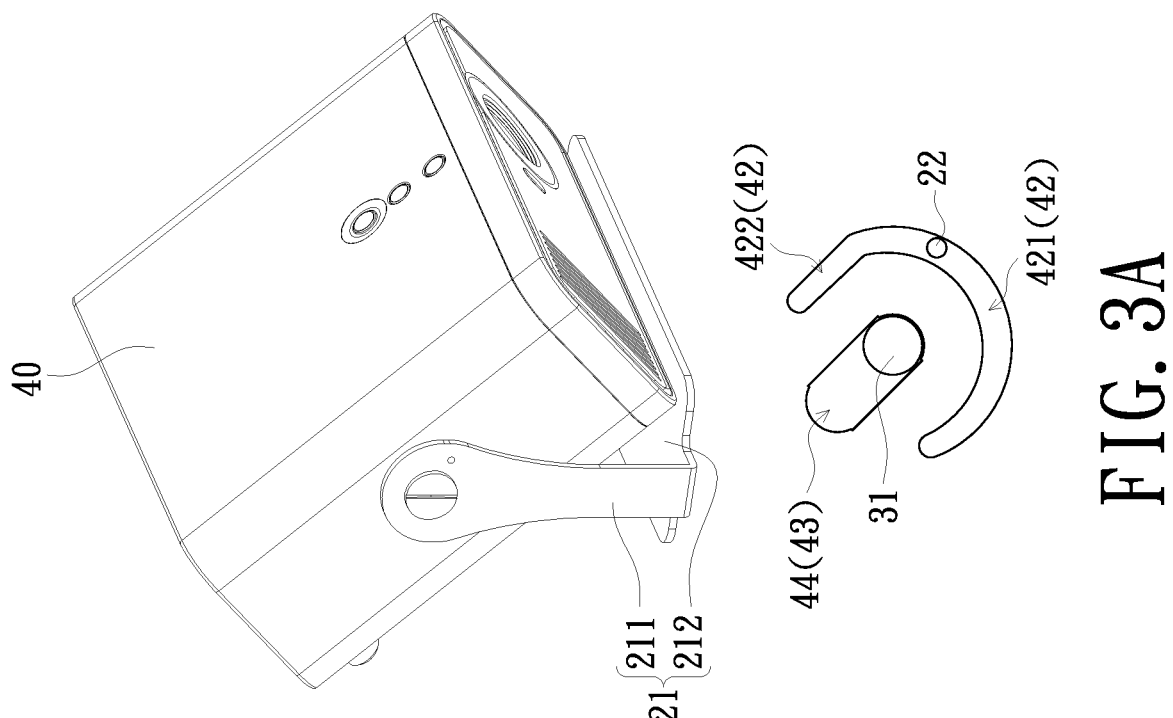
Figures 3C, 3D:
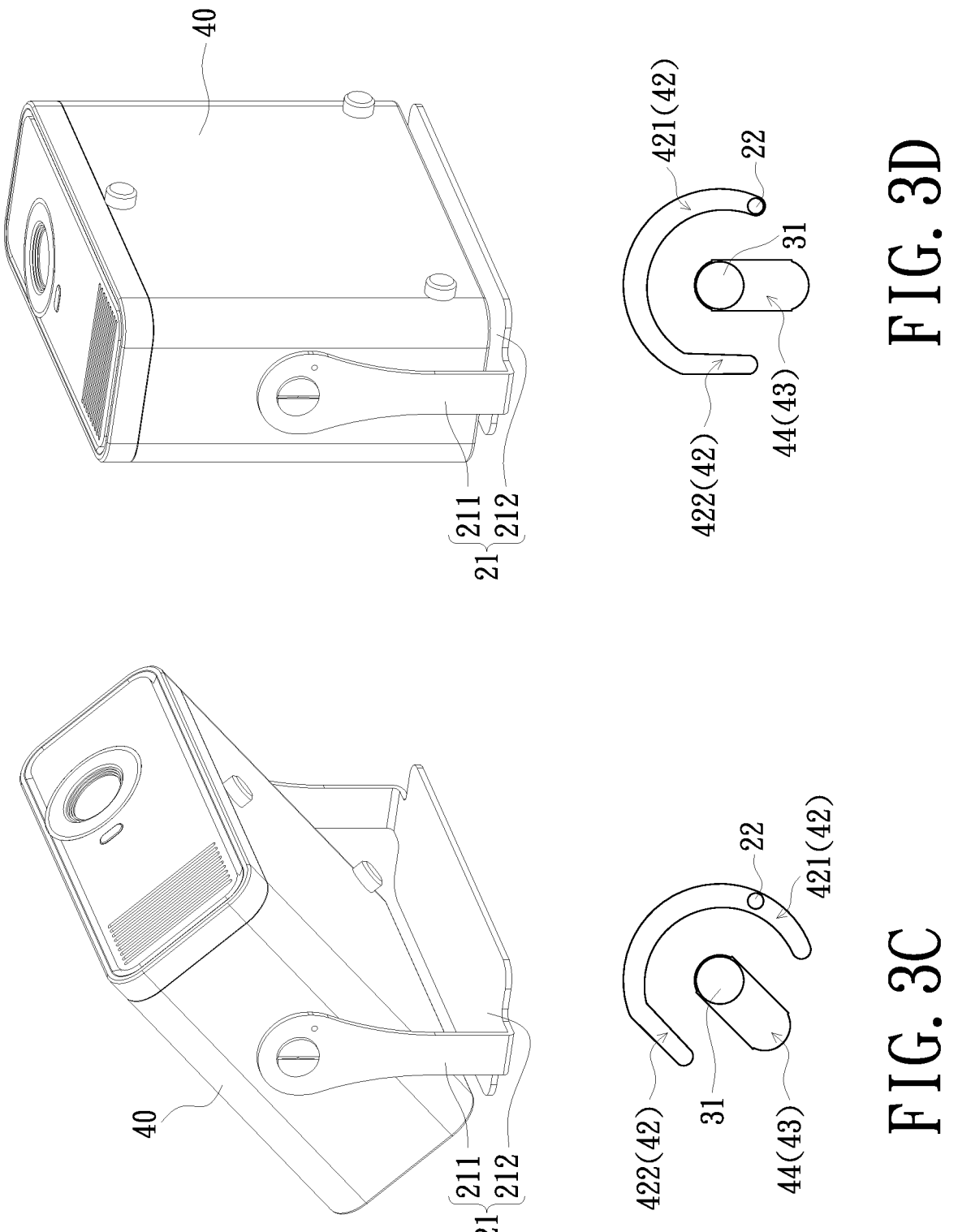

FIG. 3A to FIG. 3D are schematic diagrams of rotation of a bracket relative to a housing when a limit post moves at a curved section according to an embodiment of the present invention. As shown in FIG. 3A to FIG. 3D, and referring to FIG. 1, when the bracket 21 in this embodiment rotates relative to the adapter 31, the limit post 22 moves in the curved section 421. In this case, a relative rotation angle of the housing 40 and the bracket 21 will change. A length of the curved section 421 will affect the above relative rotation angle, and the length of the curved section 421 may be adjusted according to design requirements. As shown in FIG. 3D, in this embodiment, the length of the curved section 421 is designed, for example, to allow the base 212 to be adjacent to the third side wall 403, opposite to the second side wall 402, of the housing 40 when the limit post 22 moves to one end, away from the linear section 422, of the curved section 421, but the present invention is not limited thereto.

Figure 4B:
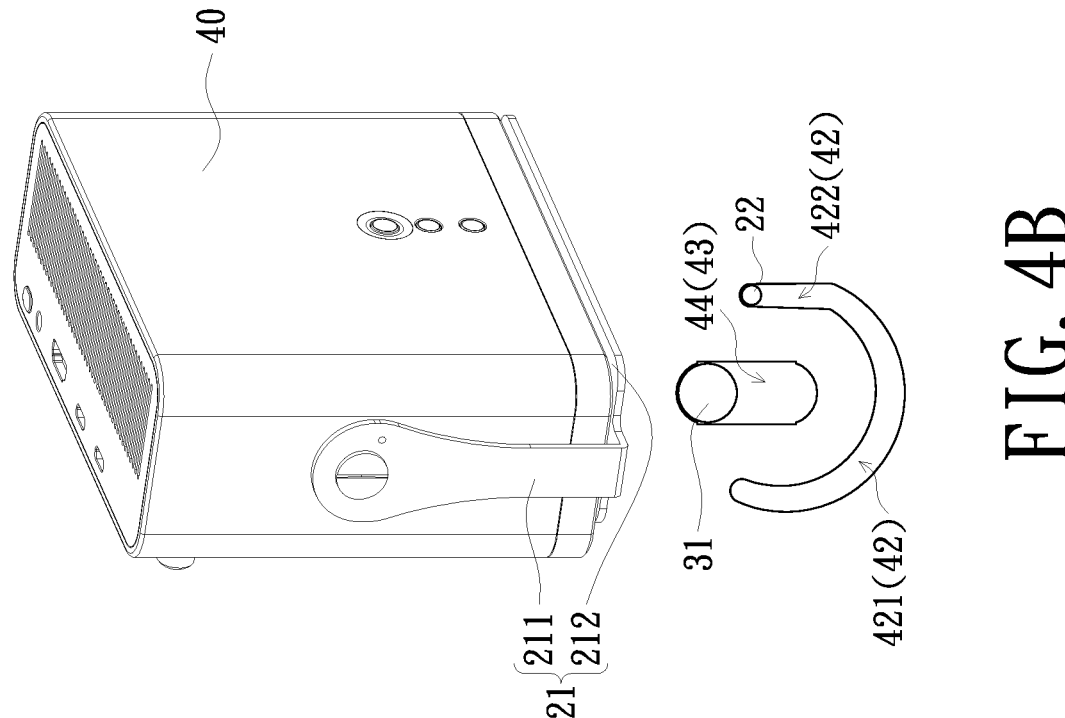
FIG. 4A and FIG. 4B are schematic diagrams of movement of a bracket relative to a housing when a limit post moves at a linear section according to an embodiment of the present invention.
Figure 4A:
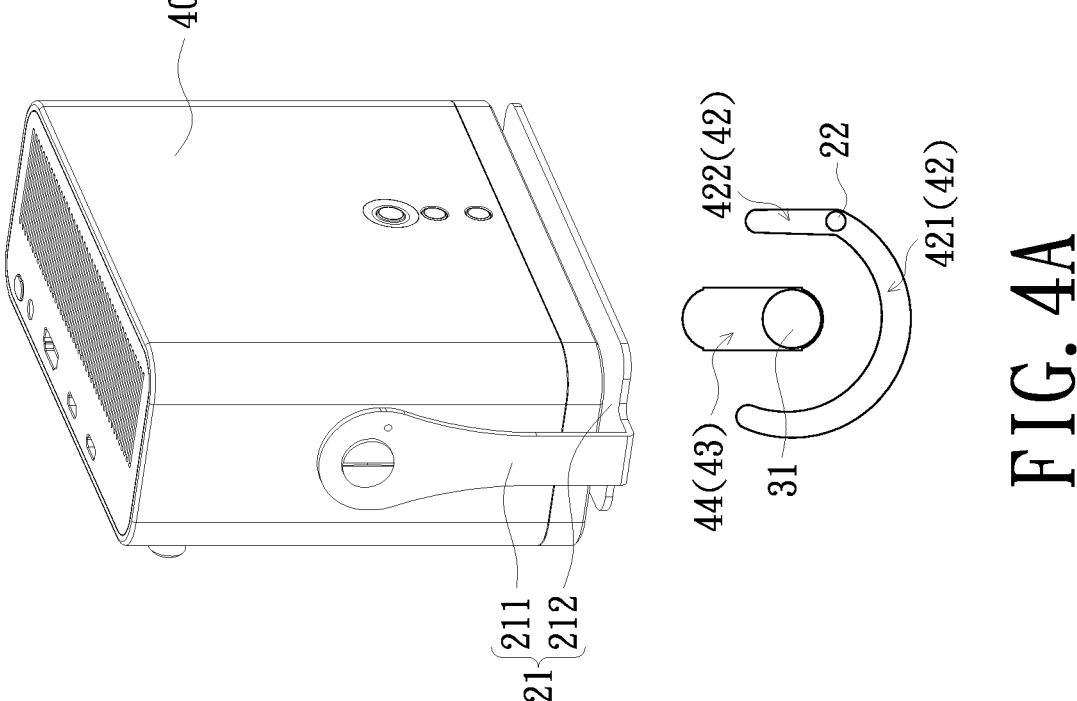

FIG. 4A and FIG. 4B are schematic diagrams of movement of a bracket relative to a housing when a limit post moves at a linear section according to an embodiment of the present invention. Referring to FIG. 1 and FIG. 4A first, when the limit post 22 moves to the linear section 422, the base 212 of the bracket 21 rotates to cover the projection hole 4021, that is, to cover the projection lens 50. In this case, there is a larger gap between the base 212 and the projection hole 4021, so the bracket 21 does not interfere with the housing 40 during rotation from a position in FIG. 3A to a position in FIG. 4A. Therefore, this interference does not need to be taken into account in shape design of the housing 40, where the shape design of the housing 40 is not limited.

In addition, when the limit post 22 moves to the linear section 422, the adapter 31 is adapted to move in the connecting portion 43 and drive the limit post 22 to move in the linear section 422. Referring to FIG. 1 and FIG. 4B, when the limit post 22 moves in the linear section 422 in a direction away from the curved section 421, the base 212 moves in a direction close to the projection hole 4021 to narrow a gap between the base 212 and the projection hole, so that in addition to reducing dust contamination of the projection lens 50, a foreign object may be prevented from scratching the projection lens 50, thereby improving the protection effect of the projection lens 50. In an embodiment, the gap between the base 212 and the projection hole 4021 may be narrowed to be 1 mm, for example.

Figure 5:
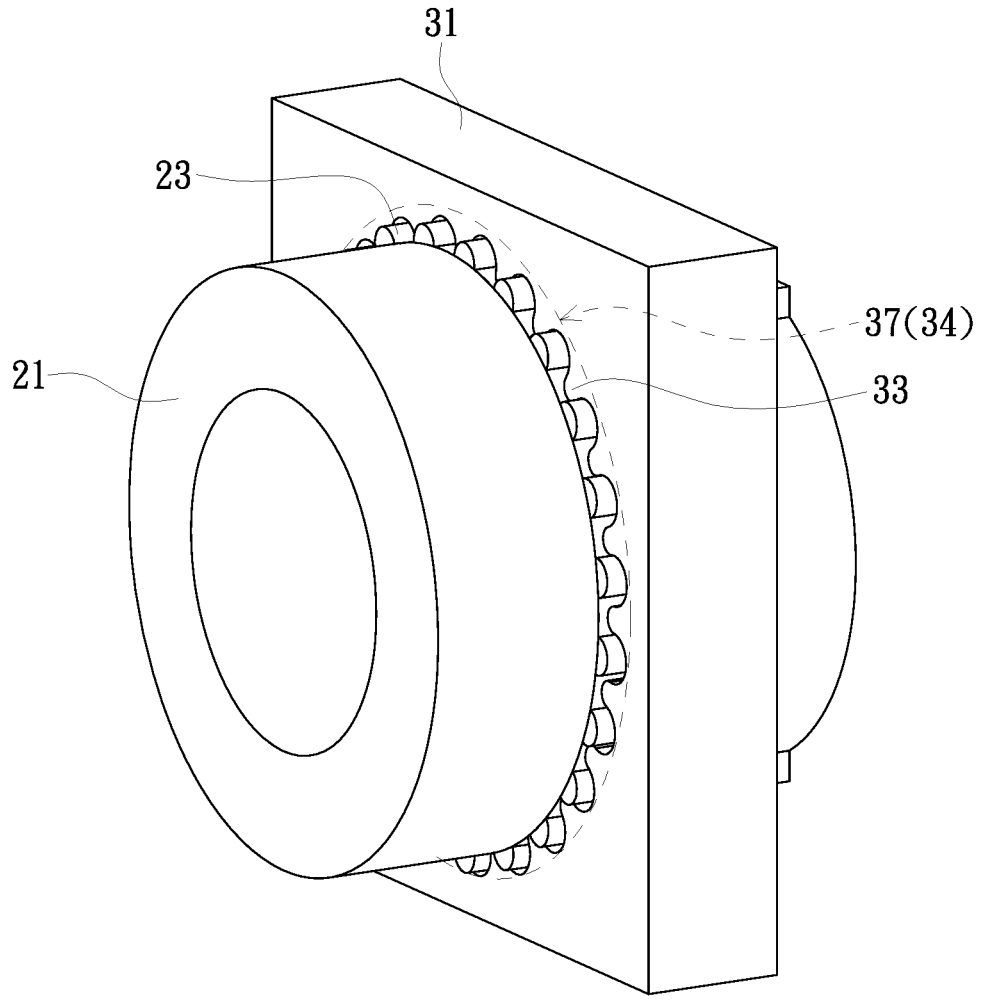
FIG. 5 is a schematic three-dimensional view of pivotally connecting a bracket to an adapter according to an embodiment of the present invention.

The structure that the bracket 21 in this embodiment is pivotally connected to the adapter 31 is described in detail below, but the present invention is not limited thereto. FIG. 5 is a schematic three-dimensional view of pivotally connecting a bracket to an adapter according to an embodiment of the present invention. To clearly describe the structure that the bracket 21 is pivotally connected to the adapter 31, drawing of the connecting portion 211 of the bracket 21 and the like is omitted. Referring to FIG. 2 and FIG. 5, in this embodiment, a first gear structure 23 is provided on one side, facing the adapter 31, of the bracket 21, the adapter 31 has a second gear structure 33 that matches with the first gear structure 23, and the first gear structure 23 is meshed with the second gear structure 33, so that the bracket 21 is pivotally connected to the adapter 31 (e.g. the bracket 21 can be rotated relative to the adapter 31 in a stepper manner). Specifically, the adapter 31 has, for example, an opening 34, the second gear structure 33 is, for example, arranged on a hole wall 37 of the opening 34, and the first gear structure 23 extends into the opening 34.

When the bracket 21 rotates to a predetermined angle, the bracket 21 may be, for example, prevented from rotating randomly since the first gear structure 23 is meshed with the second gear structure 33. In this embodiment, the first gear structure 23 extends, for example, into the opening 34 of the adapter 31, while the second gear structure 33 is arranged on the hole wall 37 of the opening 34. However, the present invention is not limited thereto. In another embodiment, the first gear structure 23 and the second gear structure 33 may be interchanged. The opening is provided on one side, facing the adapter 31, of the bracket 21, the first gear structure is arranged on the hole wall of the opening, the adapter 31 has the second gear structure that matches with the first gear structure, and the second gear structure extends into the opening. In another embodiment, the adapter 31 and the bracket 21 may not have the first gear structure 23 and the second gear structure 33 described above, and are pivotally connected to each other in a tight fit manner.

Figure 6:
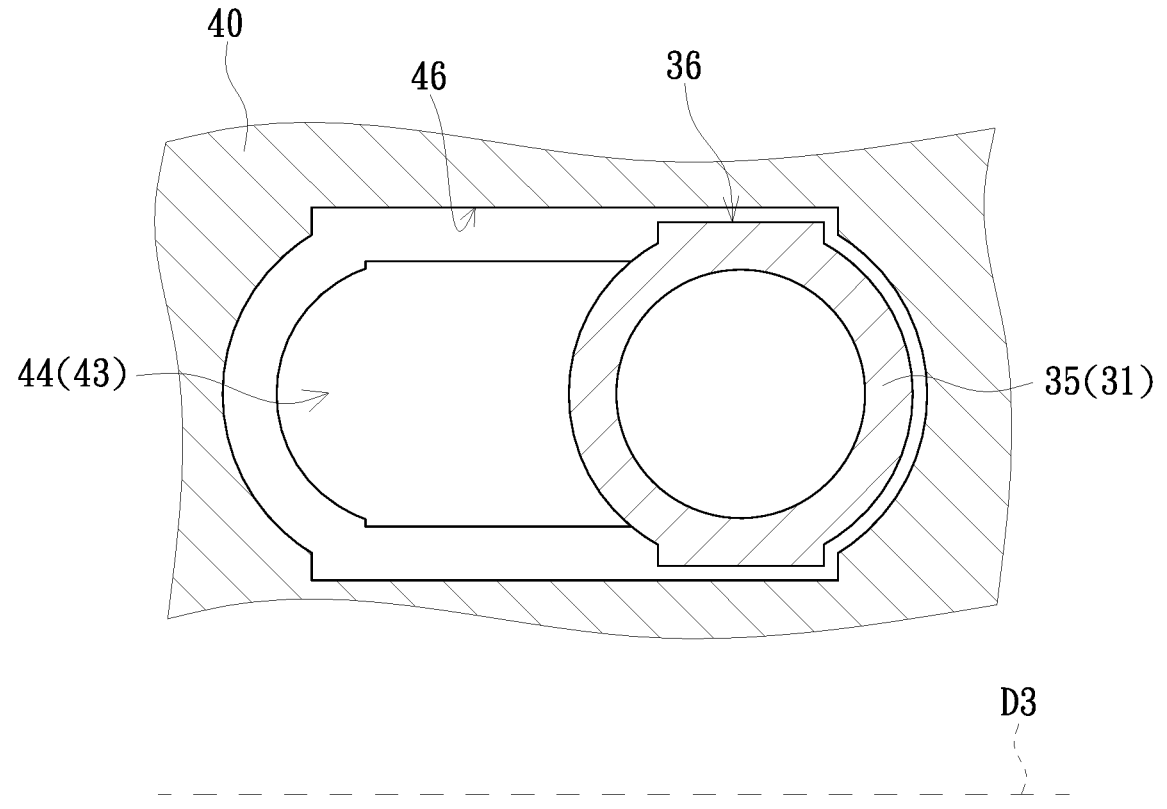
FIG. 6 is a schematic sectional view of connecting an adapter to a connecting portion according to an embodiment of the present invention.

FIG. 6 is a schematic sectional view of connecting an adapter to a connecting portion according to an embodiment of the present invention. Referring to FIG. 2 and FIG. 6, in this embodiment, a limit structure 35 is, for example, provided on one side, facing the housing 40, of the adapter 31, and the limit structure 35 has two planes 36 parallel to each other. The connecting portion 43 of the housing 40 has a connecting hole 44, the connecting hole 44 has two limit walls 46 parallel to each other, the adapter 31 is bonded to the connecting hole 44, and the two planes 36 are opposite to the two limit walls 46, respectively, so that the adapter 31 is adapted to move along a predetermined direction D3. This predetermined direction D3 is, for example, substantially parallel to the extension direction D1 of the linear section 422 as shown in FIG. 2.

Since the two planes 36 of the limit structure 35 are opposite to the two limit walls 46 of the connecting hole 44, when the limit post 22 of the bracket 21 extends into the curved section 421 of the limit groove 42 to move (i.e., the bracket 21 rotates), the limit structure 35 of the adapter 31 cannot rotate due to being restricted by the two limit walls 46 of the connecting hole 44, so that the adapter 31 does not rotate relative to the housing 40. In other words, when the bracket 21 rotates, the bracket 21 may rotate relative to the adapter 31, and thus can rotate relative to the housing 40.

In addition, during the movement of the bracket 21 in FIG. 4A and FIG. 4B, the adapter 31 is adapted to move in the connecting hole 44 of the connecting portion 43 through the cooperation between the two planes 36 of the limit structure 35 and the two limit walls 46 of the connecting hole 44, so that the bracket 21 can move with the adapter 31. In this embodiment, a length of the above two limit walls 46 in the predetermined direction D3 is, for example, greater than a length of the two planes 36 in the predetermined direction D3.

Figure 7:
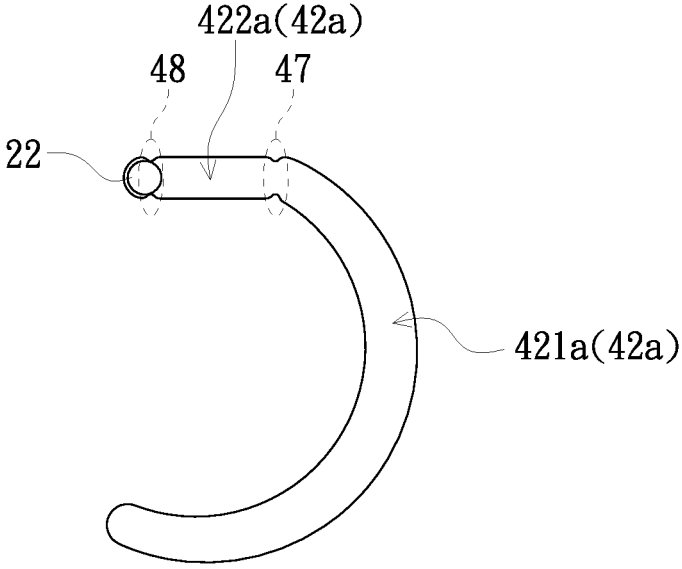
FIG. 7 is a schematic diagram of a limit groove and a limit post of a projection device according to another embodiment of the present invention.

FIG. 7 is a schematic diagram of a limit groove and a limit post of a projection device according to another embodiment of the present invention. Referring to FIG. 7, this embodiment is similar to the above projection device 1, and a main difference is that the limit groove 42*a* in this embodiment further has a limit bulge 47 and a limit bulge 48. The limit bulge 47 is located at a junction of a linear section 422*a* and a curved section 421*a*. The limit bulge 48 is arranged at a tail end, away from the curved section 421*a*, of the linear section 422*a*. In other embodiments, the limit bulge 47 and the limit bulge 48 may also be arranged alternatively.

When the limit post 22 is located between the tail end, away from the curved section 421*a*, of the linear section 422*a* and the limit bulge 48 (i.e., when the limit post 22 is located at a position in FIG. 4B), the limit post 22 cannot easily move to the position between the limit bulge 47 and the limit bulge 48 due to being restricted by the limit bulge 48, that is, the limit post 22 is clamped and fixed between the tail end of the linear section 422*a* and the limit bulge 48. In this way, referring to FIG. 1 and FIG. 4B, the base 212 of the bracket 21 can be effectively fixed in a position that can well protect the projection lens 50 and is not liable to move. In addition, referring to FIG. 1, FIG. 4A, FIG. 4B, and FIG. 7, when the limit post 22 moves to the position between the limit bulge 47 and the limit bulge 48 in the linear section 422*a* (i.e., the limit post is located in the position between FIG. 4A and FIG. 4B), the base 212 can move back and forth relative to the projection hole 4021, but the limit post 22 cannot easily move into the curved section 421*a* due to being restricted by the limit bulge 47, so that the bracket 21 cannot easily rotate.

In summary, the projection device according to the embodiment of the present invention includes the adapter, the bracket having the limit post, the connecting portion, and the limit groove, and when the limit post moves to the linear section of the limit groove, the adapter may move in the connecting portion, so that when rotating to the second side wall having the projection hole, the bracket may move in a direction of the projection hole to narrow a gap between the bracket and the projection hole, thereby improving the effect of covering the projection hole by the bracket, and avoiding the interference with the housing when the bracket rotates.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first side wall, the second side wall, the third side wall, the fourth side wall, the first fastener, the second fastener, the first gear structure, and the second gear structure are only used for distinguishing various elements and do not limit the number of the elements.

What is claimed is:

1. A projection device, comprising:
   a housing, having a first side wall and a second side wall connected to each other, wherein the first side wall has a connecting portion and a limit groove, the limit groove has a curved section and a linear section, the curved section extends around the connecting portion, the linear section is connected to the curved section, the second side wall has a projection hole, and an extension direction of the linear section is substantially parallel to a central axis of the projection hole; and
   a bracket assembly, comprising:
   an adapter, movably connected to the connecting portion; and
   a bracket, pivotally connected to the adapter and having a limit post that extends into the limit groove,
   wherein when the bracket rotates relative to the adapter, the limit post moves in the curved section, and
   wherein when the limit post moves to the linear section, the adapter is adapted to move in the connecting portion and the limit post is configured to move in the linear section when the adapter is moved.

2. The projection device according to claim 1, wherein the bracket has a connecting section and a base connected to each other, the connecting section is pivotally connected to the adapter, when the limit post moves to the linear section, the base covers the projection hole, and when the limit post moves in the linear section in a direction away from the curved section, the base moves in a direction close to the projection hole.

3. The projection device according to claim 2, wherein the housing further has a third side wall opposite the second side wall, and when the limit post moves to one end, away from the linear section, of the curved section, the base is adjacent to the third side wall.

4. The projection device according to claim 1, wherein a first gear structure is provided on one side, facing the adapter, of the bracket, the adapter has a second gear structure that matches with the first gear structure, and the first gear structure is meshed with the second gear structure, so that the bracket is pivotally connected to the adapter.

5. The projection device according to claim 4, wherein the adapter has an opening, the second gear structure is arranged on a hole wall of the opening, and the first gear structure extends into the opening.

6. The projection device according to claim 1, wherein a limit structure is provided on one side, facing the housing, of the adapter, the limit structure has two planes parallel to each other, the connecting portion of the housing has a connecting hole, the connecting hole has two limit walls parallel to each other, the adapter is bonded to the connecting hole, and the two planes are opposite to the two limit walls, respectively, so that the adapter is adapted to move along a predetermined direction.

7. The projection device according to claim 6, wherein a length of the two limit walls in the predetermined direction is greater than a length of the two planes in the predetermined direction.

8. The projection device according to claim 1, wherein a limit bulge is provided in the limit groove, and the limit bulge is located at a junction of the linear section and the curved section.

9. The projection device according to claim 1, wherein a limit bulge is arranged at a tail end, away from the curved section, of the linear section, and the limit bulge is adapted to clamp and fix the limit post between the tail end and the limit bulge.

10. The projection device according to claim 1, further comprising a first fastener and a second fastener, wherein the first fastener has a shaft portion, and the shaft portion penetrates through the bracket, the adapter, and the first side wall, and is combined with the second fastener, so that the bracket assembly is fastened to the first side wall.

* * * * *